US010741171B2

(12) United States Patent
Master et al.

(10) Patent No.: US 10,741,171 B2
(45) Date of Patent: Aug. 11, 2020

(54) KERNEL-BASED VERBAL PHRASE SPLITTING DEVICES AND METHODS (71) Applicant: NANTMOBILE, LLC, Culver City, CA (US)

(72) Inventors: Demitrios L. Master, Cupertino, CA (US); Farzad Ehsani, Sunnyvale, CA (US)

(73) Assignee: NANTMOBILE, LLC, Culver City, CA (US)

(*) Notice: Subject to any disclaimer, the term of this patent is extended or adjusted under 35 U.S.C. 154(b) by 0 days.

(21) Appl. No.: 16/505,485

(22) Filed: Jul. 8, 2019

(65) Prior Publication Data
US 2019/0378492 A1 Dec. 12, 2019

Related U.S. Application Data (63) Continuation of application No. 15/054,578, filed on Feb. 26, 2016, now Pat. No. 10,347,240.

(60) Provisional application No. 62/121,375, filed on Feb. 26, 2015.

(51) Int. Cl.
G10L 15/04 (2013.01)
G10L 15/22 (2006.01)
G06F 40/284 (2020.01)
G06F 40/289 (2020.01)
G10L 15/197 (2013.01)

(52) U.S. Cl.
CPC ............ G10L 15/04 (2013.01); G06F 40/284 (2020.01); G06F 40/289 (2020.01); G10L 15/22 (2013.01); G10L 15/197 (2013.01)

(58) Field of Classification Search
CPC ....... G06F 40/30; G06F 40/205; G06F 40/216
See application file for complete search history.

(56) References Cited

U.S. PATENT DOCUMENTS

| 5,890,103 | A | * | 3/1999 | Carus | G06F 40/284 704/9 |
| 6,161,083 | A | * | 12/2000 | Franz | G06F 40/211 704/4 |
| 6,266,637 | B1 | * | 7/2001 | Donovan | G10L 13/06 704/258 |
| 6,393,399 | B1 | * | 5/2002 | Even | G10L 15/193 704/235 |
| 7,475,010 | B2 | | 1/2009 | Chao | |

(Continued)

OTHER PUBLICATIONS

Fügen, Christian, and Muntsin Kolss. "The Influence of Utterance Chunking on Machine Translation Performance." Eighth Annual Conference of the International Speech Communication Association. 2007.

(Continued)

Primary Examiner — Matthew H Baker
(74) Attorney, Agent, or Firm — Stetina Brunda Garred and Brucker (57) ABSTRACT A device capable of splitting user input into phrases is presented. The disclosed device leverages multiple phrase splitting models to generate one or more possible split locations. The possible split locations can be derived based on leveraging multiple phrase splitting models. Each model contributes its suggested split locations to the set of possible split locations according to an implementation of a phrase splitting kernel algorithm that weights each model's suggestions.

30 Claims, 3 Drawing Sheets

(56) References Cited

U.S. PATENT DOCUMENTS

| | | | |
|---|---|---|---|
| 7,711,545 | B2 | 5/2010 | Koehn |
| 7,801,727 | B2 | 9/2010 | Gopalakrishnan et al. |
| 8,374,871 | B2 | 2/2013 | Ehsani et al. |
| 8,442,812 | B2 | 5/2013 | Ehsani et al. |
| 8,630,846 | B2 | 1/2014 | Ehsani et al. |
| 8,849,648 | B1* | 9/2014 | Bangalore ............ G06F 40/117 704/9 |
| 9,075,792 | B2* | 7/2015 | Dai ...................... G06F 40/268 |
| 9,652,454 | B2* | 5/2017 | Wu ........................ G06F 40/45 |
| 10,042,923 | B2* | 8/2018 | Markman ............. G06F 16/334 |
| 2002/0128821 | A1* | 9/2002 | Ehsani ................. G06F 40/216 704/10 |
| 2005/0154580 | A1* | 7/2005 | Horowitz ............... G10L 15/19 704/9 |
| 2006/0018551 | A1* | 1/2006 | Patterson ............ G06F 16/313 382/229 |
| 2006/0277465 | A1* | 12/2006 | Pandit .................. G06F 40/289 715/234 |
| 2007/0118514 | A1* | 5/2007 | Mariappan ........... G06F 16/951 |
| 2008/0154577 | A1* | 6/2008 | Kim ....................... G06F 40/45 704/2 |
| 2008/0249764 | A1 | 10/2008 | Huang et al. |
| 2011/0055206 | A1* | 3/2011 | Martin .................... G06F 15/16 707/723 |
| 2011/0178791 | A1* | 7/2011 | Stymne ................ G06F 40/268 704/2 |
| 2011/0191098 | A1* | 8/2011 | Thomas ................. G06F 40/20 704/9 |
| 2011/0301942 | A1* | 12/2011 | Collobert ............. G06F 40/211 704/9 |
| 2014/0163959 | A1 | 6/2014 | Hebert et al. |
| 2014/0163966 | A1* | 6/2014 | Dwarakanath ........ G06F 40/279 704/9 |
| 2014/0303955 | A1* | 10/2014 | Kim ........................ G06F 40/45 704/2 |
| 2014/0380286 | A1* | 12/2014 | Gabel .................... G06N 5/022 717/139 |
| 2015/0134320 | A1* | 5/2015 | Rangarajan Sridhar ..................... G10L 15/04 704/2 |
| 2015/0134321 | A1* | 5/2015 | Fennell ................. G06F 40/211 704/2 |
| 2017/0004205 | A1* | 1/2017 | Jain ......................... G06F 16/93 |

OTHER PUBLICATIONS

Sridhar, Vivek Kumar Rangarajan, et al. "Segmentation Strategies for Streaming Speech Translation." Proceedings of the 2013 Conference of the North American Chapter of the Association for Computational Linguistics: Human Language Technologies. 2013. pp. 230-238. Atlanta, Georgia.

Callison-Burch, Chris, and Mark Dredze. "Creating Speech and Language with Amazon's Mechanical Turk." Proceedings of the NAACL HLT 2010 Workshop on Creating Speech and Language Data with Amazon's Mechanical Turk. Association for Computational Linguistics, Jun. 2010. pp. 1-12. Los Angeles, California.

Berstein, Michael S., et al. "Soylent: A Word Processor with a Crowd Inside." Communications of the ACM 58.8 (Aug. 2015): 85-94.

Kushman, Nate, and Regina Barzilay. "Using Semantic Unification to Generate Regular Expressions from Natural Language." North American Chapter of the Association for Computational Linguistics (NAACL), 2013.

Di Fabbrizio, Giuseppe, Amanda J. Stent, and Robert Gaizauskas. "Summarizing Opinion-Related Information for Mobile Devices." Mobile Speech and Advanced Natural Language Solutions. Springer New York, 2013. 289-317.

* cited by examiner

KERNEL-BASED VERBAL PHRASE SPLITTING DEVICES AND METHODS

CROSS-REFERENCE TO RELATED APPLICATIONS

This application is a continuation of U.S. application Ser. No. 15/054,578, filed on Feb. 26, 2016, which relates to and claims the benefit of U.S. Provisional Application No. 62/121,375 filed Feb. 26, 2015 and entitled "KERNEL-BASED VERBAL PHRASE SPLITTING DEVICES AND METHODS", the entire disclosures of which are hereby wholly incorporated by reference.

STATEMENT RE: FEDERALLY SPONSORED RESEARCH/DEVELOPMENT

This invention was made with government support under Grant No. 2R44DK089900-02 awarded by the U.S. National Institutes of Health (NIH) Small Business Innovation Research (SBIR). The government has certain rights in the invention.

BACKGROUND

1. Technology Field

The present disclosure is directed to natural language processing.

2. Related Art

The background description includes information that may be useful in understanding the present inventive subject matter. It is not an admission that any of the information provided herein is prior art or relevant to the presently claimed inventive subject matter, or that any publication specifically or implicitly referenced is prior art.

Keeping a food diary, i.e. a detailed log of all food consumed, can be a powerful mechanism to lose weight or monitor a person's nutrition. Currently, there exists a large number of mobile or web-based food tracking applications. Food tracking can be quite time consuming and tedious for users. Verbal language recognition technology is used to make the food tracking task easier that allows users to simply speak what they have eaten into the microphone or keyboard of a device, such as a mobile phone, smartphone, tablet, computer or other device. For example, a user might verbalize: "For breakfast I had a bowl of oatmeal with strawberries and a soy latte with honey." Before starting a database query for the foods mentioned in this example sentence, a digital representation of the uttered sentence is typically processed through natural language processing steps such as normalization, stemming, and tagging. However, such processes fail to identify how to properly split the digital representations of the words of the provided utterance. The food domain is replete with compound words and mixed phrases making the parsing of verbalized words and sentences challenging to accurately identify the type of food a user wishes to track.

Related work with regard to the basic natural language processing task of splitting compound words includes, for example, U.S. Pat. No. 7,711,545 to Philip Koehn entitled "Empirical Methods for Splitting Compound Words with Application to Machine Translation", issued May 4, 2010, the substance of which is incorporated herein by reference. However, the rank splitting employed and disclosed in U.S. Pat. No. 7,711,545 is solely based on frequency of occurrence in a single corpus and thus fails to take into account a multitude of different information sources in order to improve the splitting accuracy.

Prior research also exists in employing a splitter for compound words for use in the context of automated speech recognition and language modeling, see U.S. Pat. No. 7,801,727 to Gopalakrishnan et al. entitled "System and Method for Acoustic and Language Modelling for Automatic Speech Recognition with Large Vocabularies" issued Sep. 21, 2010, the substance of which is incorporated herein by reference. The disclosure of U.S. Pat. No. 7,801,727 fails to provide insight into domain-specific subject matter such as dealing with food; handling recipes and restaurant menus that contain nutritional information, for example. The disclosure of U.S. Pat. No. 7,801,727 is aimed at recognition of acoustic data rather than seeking to extract the correct food grouping for subsequent food database queries for nutritional information.

All patents or publications identified herein are incorporated by reference to the same extent as if each patent, individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for a device that can split a food-related text with high accuracy based on employing multiple splitting algorithms and rank-merging the results.

BRIEF SUMMARY

The inventive subject matter provides apparatus, systems and methods in which a computing device is able to determine how to split digital representations of spoken words relating to food into words. One aspect of the inventive subject matter includes a computing device (e.g., cell phone, smart phone, PDA, tablet, smart watch, etc.) having a processor, a display, and a memory. The device further comprises a phrase splitting kernel module that executes on the processor according to software instructions stored in the memory and configures the processor to execute steps regarding splitting digital representations of an utterance. Further, the phrase splitting kernel module includes digital implementations of multiple phrase splitting models. The phrase splitting kernel module receives a digital representation of an utterance and stores the digital representation in the memory. The phrase splitting kernel module leverages each implementation of the phrase splitting models or databases to generate a list of suggested split locations between representations of uttered words. The suggested split location lists from each model or database are compiled into a set of split locations according an implementation of a phrase splitting kernel algorithm and as a function of the suggested split locations. For example, the set of split locations could comprise a ranked listing of split locations were the rank is determined based on weights associated with each phrase splitting kernel. The phrase splitting kernel module further splits the digital representation into a set of n-grams comprising words and stored in the memory according to the set of phrase split locations. The n-grams are then used to cause content related to at least some of the n-grams to be rendered on the display; possibly including calorie or nutrition information associated with food.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It should be noted that any language herein directed to a computer should be read to include any suitable combination of computing devices, including servers, interfaces, systems, databases, agents, peers, engines, controllers, or other types of computing devices operating individually or collectively. One should appreciate the computing devices comprise at least one processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In various disclosed embodiments, the various servers, systems, databases, or interfaces exchange data using standardized protocols or algorithms, possibly based on SMS, MMS, HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a cellular network; a circuit switched network; cell switched network or other type of network.

As used in the description herein and throughout the claims that follow, when a system, engine, module, or other computing element is described as configured to perform or execute functions on data in a memory, the meaning of "configured to" or "programmed to" is defined as one or more processors being programmed by a set of software instructions stored in the memory of the computing element to execute the set of functions on target data or data objects stored in memory.

Extracting meaning from text including spoken text represents a core challenge in the field of natural language processing. The inventive subject matter presented herein relates to a device that is configurable or programmed to perform meaning extraction from complex, iterative noun phrases in a given domain; the food domain, for example.

Meaning extraction is achieved or augmented via creating a list of most likely splits in digital representations of complex noun phrases. One example domain is the food domain. In this domain, a complex, iterative noun phrases present many challenges. For example, consider the phrase "Hamburger with guacamole and fries". This phrase might mean that a person wishes to record or track that they have eaten a Hamburger with guacamole on top of the patty and a side dish of fries. Thus, the person might wish to learn more about the nutritional value of these foods. The disclosed approach enables computing devices to parse such an utterance, determine a meaning of the utterance based on splitting the phrase appropriately, and obtain information related to the utterance (e.g., recipes, nutrition information, calorie count, etc.) based on the split phrase information. Further, the information can be obtained from multiple data sources in parallel.

Figure 1:
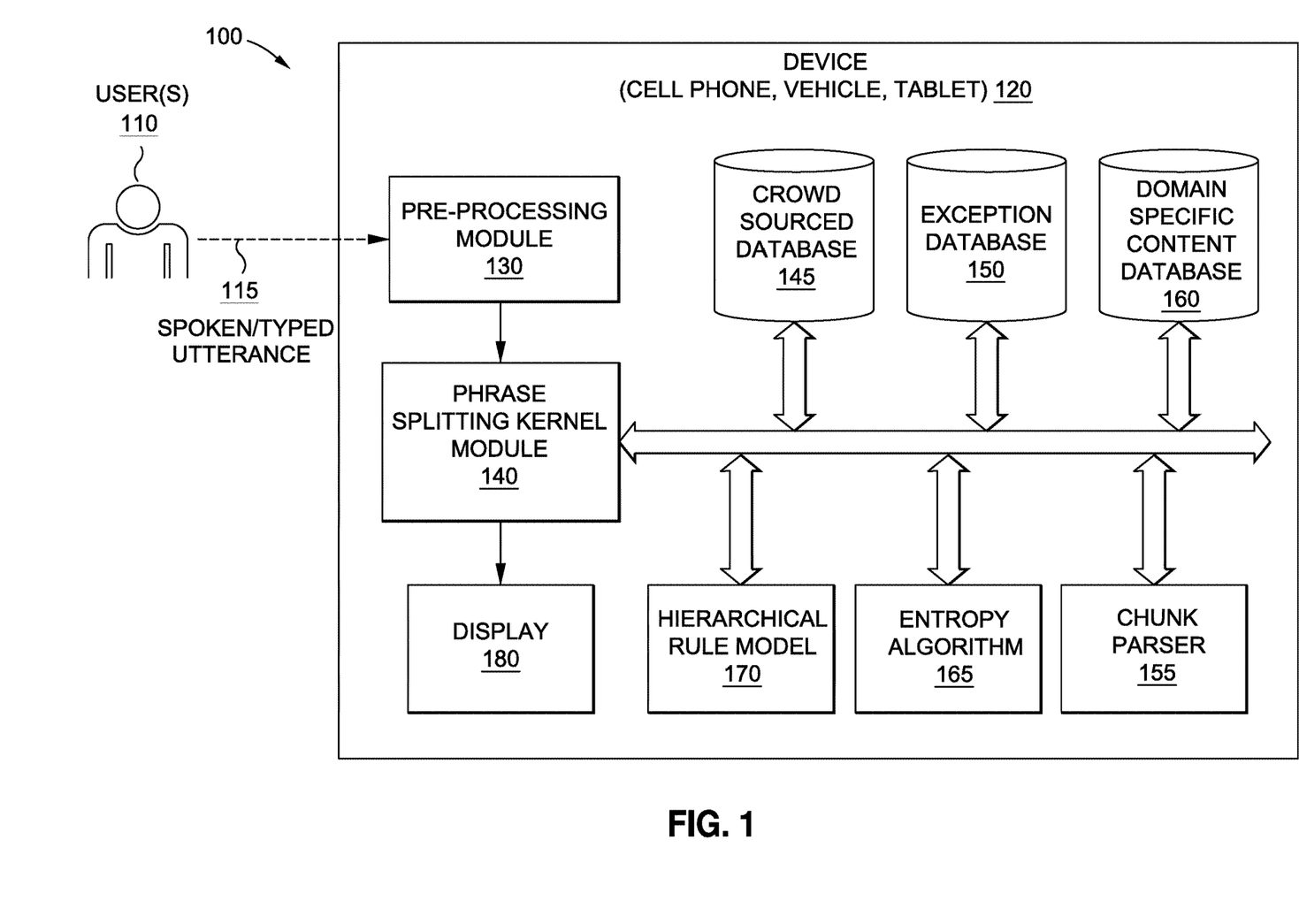
FIG. 1 is a schematic view of the device with the splitting kernel and other components.

The disclosed inventive subject matters describes a device comprising of an input module, a memory configured to store a plurality of phrase splitting models and a phrase splitting kernel module. FIG. 1 presents an exemplary embodiment. A user 110 produces the incoming signal 115 in the form of an utterance that is sent to the preprocessing module 130 on the device 120 in the form of a digital representation (e.g., G.711, MPG, etc.). The modality of input can be from sensors or interfaces on, for example, a mobile device, such a microphone, keyboard, or screen interface. Depending on the modality of the input 115, the preprocessing module 130 performs the necessary spell-checking, recognition, tokenization or feature extraction on the input signal 115. The pre-processed version of this input signal 115 is then passed on to the splitting kernel module 140. This splitting kernel module 140 sends the preprocessing input 115 to each of six splitting models 145, 150, 155, 160, 165 and 170. Although FIG. 1 illustrates six (6) splitting models, it should be appreciated that the inventive subject matter could include any practical number of models.

Each of the splitting models 145, 150, 155, 160, 165 and 170 each employs an implementation of a different algorithm or process to provide a list of possible split positions in the input 115. For example: model 145 comprises a crowd source database; Model 150 comprises an exception database; Model 160 comprises a domain specific content database; Model 165 comprises an entropy algorithm; and Model 170 comprises a hierarchical rule model. The output of each splitting models 145, 150, 155, 160, 165 and 170 is then combined by the splitting kernel module 140 in a weighted sum that results in ranked list of the most likely splitting locations. For example, in the domain of a food tracking application, each phrase in a 'split-processing' input signal will be looked up in a food name database and presented separately to the user via the display 180.

Figure 2:
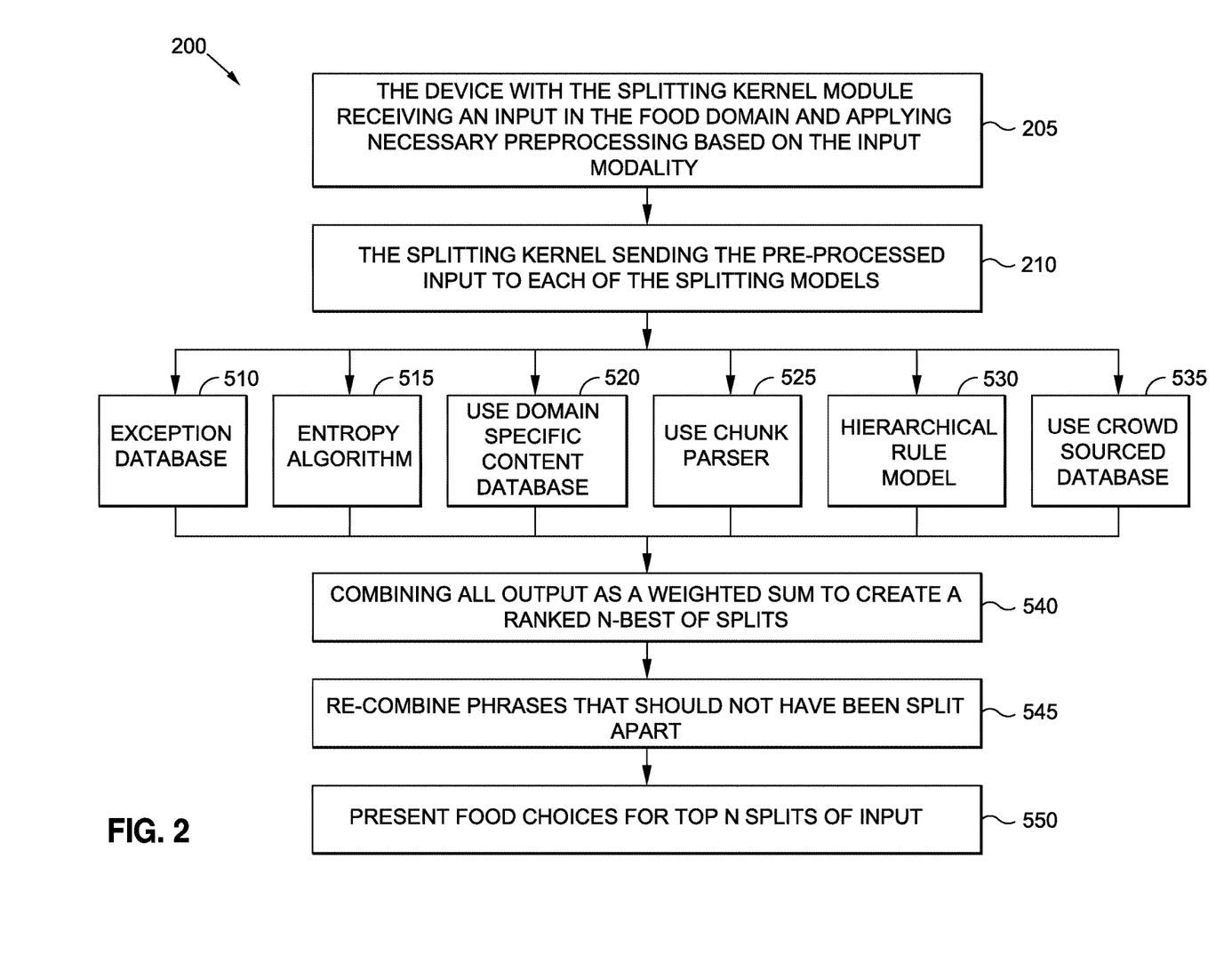
FIG. 2 describes the process of creating an N-Best of splits for a given input.

FIG. 2 contains a procedural description of the splitting algorithm. The system uses six (6) different mechanisms for splitting food sentences, phrases or words. Model 515 uses Word Entropy to split the words. Model 520 uses the domain specific content to split the data. Model 525 uses the phrase chunking algorithm. Model 530 uses the Hierarchical rules. Model 510 uses the exception database. Model 535 uses the crowd sourced database. The results of these models are combined with each other in module 540. The process and device then re-combines split phrases that are invalid in module 545. For example in the food domain we might combine "chicken salad" with "sandwich" to be "chicken salad sandwich". Finally we output the results for the top N choices in module 550. Although language processing indicated relates to food items, it is additionally contemplated that the language processing could be applied to other domains.

A Description of the various splitting models.

In some embodiments, n-gram database module 145 can be configured to contain accumulated splitting statistics generated by crowdsourcing operations such as Amazon® Mechanical Turks creating split annotations for a large number of domain-specific sentences; There could be allotted 100,000 food sentences for the food domain. Each food sentence can be annotated by three different Mechanical Turks as to how the Turk would split the respective sentence. Then, the frequency of occurrence is calculated for each n-gram phrase based on all annotated splits in the training corpus. Next, a threshold for minimum occurrence can be applied to all n-grams. Those n-grams with an occurrence frequency above the threshold are stored in n-gram database module 145. Any new food sentence gets compared with all n-grams in this database (note that the comparison is uni-directional). The response of a query with the input 115 to this database 145 is a list of set of suggested split locations for this input 115.

The chunk parser model 155 can be based on implementation of the phrase chunking algorithms as described in co-owned U.S. Pat. No. 8,374,871 to Ehsani et al. titled "Methods for Creating a Phrase Thesaurus"; U.S. Pat. No. 8,442,812 to Ehsani et al. titled "Phrase-Based Dialogue Modeling with Particular Application to Creation an Recognition Grammar for a Voice-Controlled User Interface"; and U.S. Pat. No. 8,630,846 to Ehsani et al. titled "Phrase-Based Dialogue Modeling with Particular Application to Creating a Recognition Grammar", all of which are incorporated herein by reference. The database associated with this module 155 can be based on the output of applying the same training corpus of domain-specific sentenced discussed above as processed by a series natural language preprocessing steps (e.g., spell-check, normalization, stemming, named-entity detection, part of speech tagging and chunk parsing). Applying a splitting algorithm that is based on point-wise mutual information and entropy yields essentially a domain-specific dictionary; a food phrase dictionary for example.

The splitting kernel module 140 takes the known items in a current domain and uses them as good candidates. For example if "bacon double cheeseburger" is in the domain specific database model 160, it is identified as a possible candidate. If there is an exact match for this item, then this current n-gram being analyzed does not require further splitting and can be considered an invariant facet.

Hierarchical rule model 170 comprises a rule-based implementation that splits an incoming food sentence whenever one of a handful 'split words' such as 'and', 'with', 'on' are detected. Thus, a set of suggested split locations would be determined based on occurrence and location of such split words.

Yet another algorithm model 165 calculates the entropy between all consecutive words in a sentence. If the entropy is below a pre-defined threshold, then a current location would be a candidate or suggested split location. Note that low entropy means high perplexity, thus, low entropy indicates that many different words have been seen following a word. For example, the entropy between 'spare' and 'rib' in 'spare ribs' is high, at least within the in the food domain, few other words have been observed following 'spare' and therefore this would not be a split location.

The exception database module 150 can comprise a list of domain specific exception rules that can optionally be configured by a human. For example, in the food domain, exception database module 150 could contain rules regarding super composite food words such as 'sandwich,', 'pizza', 'wraps', or 'salad'. Words preceding these words do not get split. For example, "chicken wrap" would likely not generate a suggested split location between the words. However, the location after "wrap" could generate a split location.

Once the splitting kernel module 140 receives the sets of suggested split locations of each splitting model or database, the splitting kernel creates a ranked list of possible split locations where each of the suggested split locations can be weighted according to the kernel weights. It should be appreciated that the kernel weights can be determined, at least initially, based on empirical validation. For example, additional Mechanical Turks could be employed to determine if the results of the kernel approach are subjectively valid. If not, the weights can be adjusted. Further, in the field, users can provide guidance based on the user's interaction with the possible split locations. If the user indicates that the suggested split locations are improper, then the kernel weights can be readjusted according. This set of suggested split location is then combined and the frequency of each location is counted based on their weight.

Each N top phrase chunks are then associated with their content information such as nutritional information in our food domain example and displayed on the display module 180 for presentation to the user.

One should appreciate that the disclosed techniques provide many advantageous technical effects including configuring a computing device to map user digital input to domain-specific content based on effectively splitting the user digital input into words. More specifically, the device is configured to quickly determine possible locations of the digital input based on implementations of multiple phrase splitting models.

Figure 3:
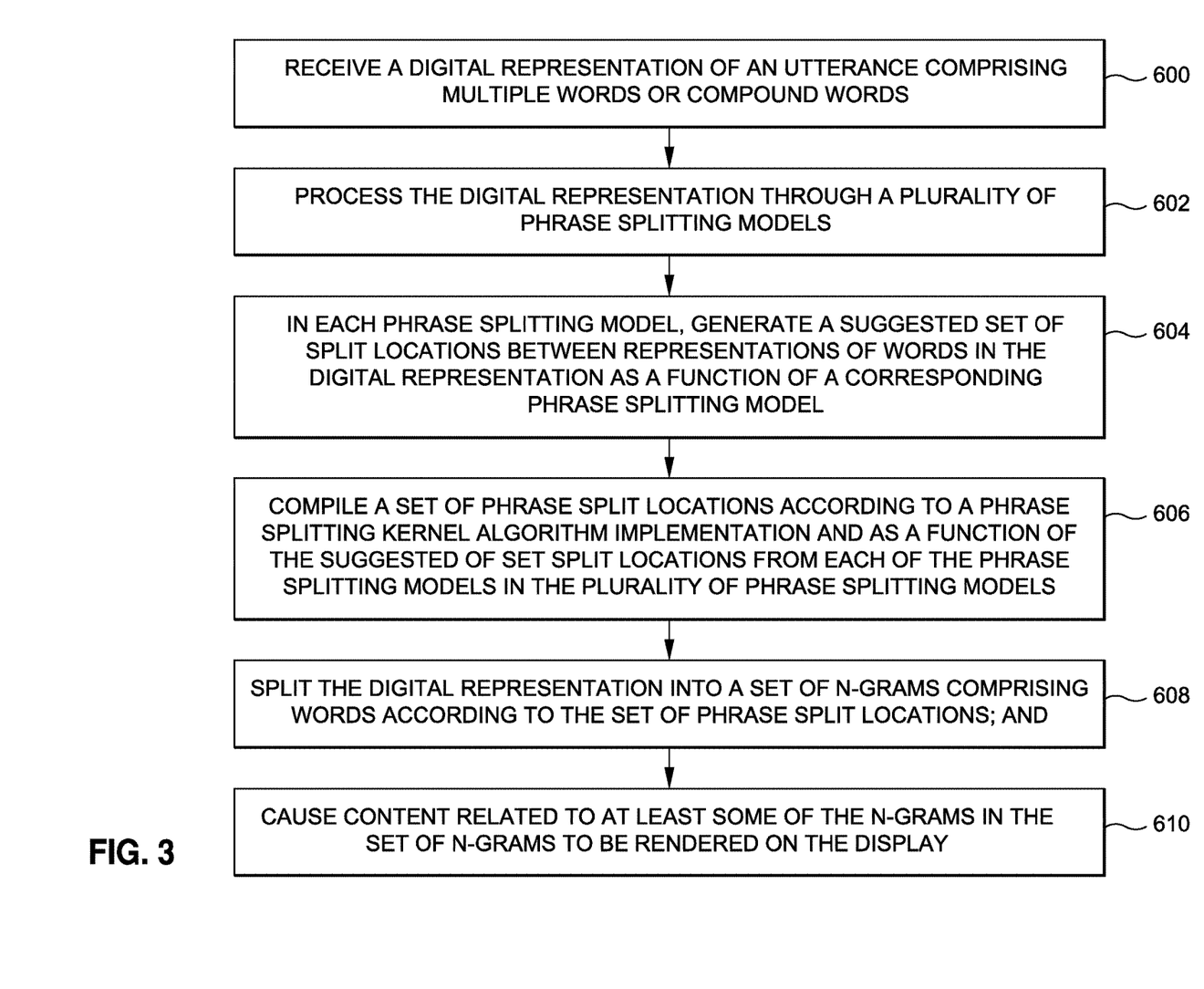
FIG. 3 is a schematic flow diagram of the steps employed by the device and method of phrase splitting.

Referring particularly to FIG. 3, with reference to FIG. 1, there is shown the steps of the process disclosed that is implemented by the phrase splitting kernel module 140. In operation, a user 110 conveys an utterance 115 verbally or through a typed utterance through a keyboard or device interface to the device 120 to produce a digital representation of the utterance 115. The utterance 115 is captured by a sensor of the device 120, for example, such as a microphone. The pre-processing module 130 receives the digital representation of the utterance and pre-processes the digital representation of the utterance 115 and presents the pre-processed digital representation of the utterance 115 to the phrase splitting kernel module 140. FIG. 3 is a flow diagram representation of the process performed by the phrase splitting kernel module 140 in conjunction with the various phrase splitting models 145, 150, 155, 160, 165 and 170.

Step 600 indicates that the phrase splitting kernel module receives a digital representation of an utterance where that utterance comprises multiple words or compound words. It should be appreciated that the words could comprises words in a target language or could also include words represented in an inter lingua franca. It is contemplated that the utterance can be combinations of sentences, phrases and words. In step 602 the digital representation of the utterance is processed using the plurality of phrase splitting models. The phrase splitting models include the models, or other known models or those yet to be created, referred to in FIGS. 1 and 2, here referred to as Model 515 using Word Entropy to split the words, Model 520 using the domain specific content to split the data, Model 525 using a phrase chunking algorithm, Model 530 using the Hierarchical rules, Model 510 uses an exception database, and Model 535 using the crowd sourced database. The results of these models are combined with each other in module 540.

In step 604, with respect to each phrase splitting model utilized, a suggested set of split candidate locations between representations of words in the digital representation of the utterance is generated as a function of the corresponding phrase splitting model. In step 606, a compiled set of phrase split locations according to a phrase splitting kernel algorithm is implemented as a function of the suggested split locations from each of the plurality of phrase splitting models. In step 608, the digital representation of the utterance is split into a set of n-grams comprising words according the set of phrase split locations. Step 610 shows that content related to at least some of the n-grams in the set of n-grams is caused to be rendered on a display. For example, the set of n-grams can include food-related words. As a more detailed example, the utterance may have included "cheeseburger and fries." In this regard the words may have been split into "cheeseburger" and "fries" and therefore two listings for the nutritional and/or caloric content of both a "cheeseburger" and "fries" would appear on the display of a device. A user could note the nutritional information for their knowledge, but also could save the information to storage in order to track the nutritional intake for a particular meal.

One of the goals of the disclosed inventive subject matter is to enable construction or configuration of a computing device to operate on vast quantities of digital data, beyond the capabilities of a human. Although the digital data represents food related data, it should be appreciated that the digital data is a representation of one or more digital models of food, not food itself. By instantiation of such digital models in the memory of the computing devices, the computing devices are able to manage the digital manage in a manner that could provide utility to a user of the computing device that the user would lack.

The above discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The above description is given by way of example, and not limitation. Given the above disclosure, one skilled in the art could devise variations that are within the scope and spirit of the disclosure herein, including various ways of splitting digital representations of verbal phrases. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A computing device comprising:
   a memory configured to store a plurality of phrase splitting models wherein said plurality of phrase splitting models comprises at least a first phrase splitting model having a first process to provide a list of possible split locations and a second phrase splitting model having a second process different from the first process to provide a list of possible split locations; and
   a processor coupled with the memory and that executes, based on software instructions stored in the memory, operations comprising:
      receiving a digital representation of an utterance comprising multiple words;
      for each phrase splitting model in the plurality of phrase splitting models, generating a suggested set of split locations between representations of words in the digital representation as a function of a corresponding phrase splitting model in the plurality of phrase splitting models;
      compiling a set of phrase split locations according to a phrase splitting kernel algorithm implementation as a function of the suggested set of split locations from each of the phrase splitting models in the plurality of phrase splitting models based, at least in part, on weights associated with each of the phrase splitting models wherein the weights are capable of adjustment;
      splitting the digital representation into a set of tokens comprising words according to the set of phrase split locations; and
      causing content related to at least some of the tokens in the set of tokens to be rendered on a display.

2. The device of claim 1, wherein the operations further comprise querying a content database storing the content as a function of the set of tokens.

3. The device of claim 2, further comprising the content database stored in the memory.

4. The device of claim 2, wherein the operations further comprise mapping at least some of the tokens to meaning invariant facets.

5. The device of claim 4, wherein the meaning invariant facets comprises at least one of the following: a brand, a type, a unit of measure, a preparation, an ingredient, a nutritional value, and a health factor.

6. The device of claim 4, wherein the operations further comprise generating the query according to hierarchical rules based on the meaning invariant facets.

7. The device of claim 4, wherein the content is indexed in the content database according to the meaning invariant facets.

8. The device of claim 1, wherein the plurality of phrase splitting models comprises domain-specific models with respect to a specific domain.

9. The device of claim 8, wherein the specific domain comprises a food domain.

10. The device of claim 9, wherein the content comprises digital content associated with the food domain.

11. The device of claim 10, wherein the content comprises digital content associated with at least one of the following food-related meaning invariant facets: a brand, a type, a nutrition, a preparation, an ingredient, a food, and a unit.

12. The device of claim 1, wherein the content comprises at least one of the following: object information, an image, a video, a metric, a classification, audio, a coupon, a web site, a news article, a study, and a promotion.

13. The device of claim 1, wherein the digital representation of the utterance comprises an audio format.

14. The device of claim 1, wherein the digital representation of the utterance comprises a text representation of the utterance.

15. The device of claim 1, wherein the digital representation of the utterance comprises a tokenized representation of the utterance.

16. The device of claim 15, wherein the tokenized representation comprises a normalized representation.

17. The device of claim 1, wherein at least one of the phrase splitting models comprises a mechanical turk phrase splitting model.

18. The device of claim 1, wherein at least one of the phrase splitting models comprises a phrase chunking model.

19. The device of claim 1, wherein at least one of the phrase splitting models comprises a domain-specific token matching model.

20. The device of claim 1, wherein at least one of the phrase splitting models comprises a split-word matching model.

21. The device of claim 1, wherein at least one of the phrase splitting models comprises a consecutive word entropy model.

22. The device of claim 1, wherein at least one of the phrase splitting models comprises an exception model.

23. The device of claim 1, wherein at least one of the suggested set of split locations from the phrase splitting models in the plurality of phrase splitting models comprises a NULL set.

24. The device of claim 1, wherein the weights comprises at least one of a frequency and an entropy measure.

25. The device of claim 1, further comprising a mobile device housing the processor and the memory, the housing further comprising a display.

26. The device of claim 25, wherein the mobile device comprises at least one of the following: a smart phone, a tablet, and a phablet.

27. The device of claim 1 wherein the weights are determined based, at least in part, on empirical validation.

28. The device of claim 1 wherein the weights are adjusted, at least in part, as a function of at least one of the following: user interaction, user input and determination by at least one Mechanical Turk.

29. A computer-based language recognition method using at least one processor coupled with a memory storing software instructions, the method comprising:
   receiving a digital representation of an utterance comprising multiple words;
   generating a suggested set of split locations between representations of words in the digital representation as a function of at least a first phrase splitting model and a second phrase splitting model;
   compiling a set of phrase split locations according to a phrase splitting kernel algorithm implementation as a function of the suggested set of split locations from each of the first phrase splitting model and the second phrase splitting model based, at least in part, on adjustable weighted sums associated with each of the first phrase splitting model and the second phrase splitting model;
   splitting the digital representation into a set of tokens comprising words according to the set of phrase split locations; and
   causing content related to at least some of the tokens in the set of tokens to be rendered on a display.

30. A non-transitory computer readable medium comprising instructions executable by a computer processor to execute processing comprising:
   receiving a digital representation of an utterance comprising multiple words;
   generating a suggested set of split locations between representations of words in the digital representation as a function of at least a first phrase splitting model and a second phrase splitting model;
   compiling a set of phrase split locations according to a phrase splitting kernel algorithm implementation as a function of the suggested set of split locations from each of the first phrase splitting model and the second phrase splitting model based, at least in part, on adjustable weighted sums associated with each of the first phrase splitting model and the second phrase splitting model;
   splitting the digital representation into a set of tokens comprising words according to the set of phrase split locations; and
   causing content related to at least some of the tokens in the set of tokens to be rendered on a display.

* * * * *